(12) United States Patent
Holligan et al.

(10) Patent No.: US 11,216,831 B1
(45) Date of Patent: Jan. 4, 2022

(54) PREDICTIVE MACHINE LEARNING MODELS

(71) Applicant: States Title, Inc., San Francisco, CA (US)

(72) Inventors: Brian Holligan, San Francisco, CA (US); Andy Mahdavi, San Francisco, CA (US)

(73) Assignee: States Title, Inc., San Francisco, CA (US)

( * ) Notice: Subject to any disclaimer, the term of this patent is extended or adjusted under 35 U.S.C. 154(b) by 0 days.

(21) Appl. No.: 16/525,317

(22) Filed: Jul. 29, 2019

(51) Int. Cl.
*G06Q 50/16* (2012.01)
*G06N 20/00* (2019.01)
*G06Q 30/02* (2012.01)

(52) U.S. Cl.
CPC ......... *G06Q 30/0202* (2013.01); *G06N 20/00* (2019.01); *G06Q 30/0201* (2013.01); *G06Q 50/16* (2013.01)

(58) Field of Classification Search
CPC ................................................. G06Q 30/0202
See application file for complete search history.

(56) References Cited

U.S. PATENT DOCUMENTS

| | | | |
|---|---|---|---|
| 5,361,201 A | 11/1994 | Jost et al. | |
| 7,472,096 B2 | 12/2008 | Burges et al. | |
| 10,255,550 B1 | 4/2019 | Simkoff et al. | |
| 10,510,009 B1 * | 12/2019 | Mahdavi | G06N 5/04 |
| 10,755,184 B1 | 8/2020 | Holligan et al. | |
| 2004/0059653 A1 | 3/2004 | Verkuylen et al. | |
| 2005/0210068 A1 | 9/2005 | Szymanski et al. | |

(Continued)

FOREIGN PATENT DOCUMENTS

WO   WO 2014/014759   1/2014

OTHER PUBLICATIONS

G. Arutjothi and C. Senthamarai, "Prediction of loan status in commercial bank using machine learning classifier," 2017 International Conference on Intelligent Sustainable Systems (ICISS), 2017, pp. 416-419, doi: 10.1109/ISS1.2017.8389442. (Year: 2017).*

(Continued)

*Primary Examiner* — Maria C Santos-Diaz
(74) *Attorney, Agent, or Firm* — Fish & Richardson P.C.

(57) ABSTRACT

Methods, systems, and apparatus, including computer programs encoded on computer storage media, for training and applying a machine learning model. One of the methods includes the actions of obtaining a plurality of data points associated with a parcel of real property; using a machine learning model to generate a prediction from the obtained plurality of data points, the prediction indicating a likelihood that the real property will satisfy a particular parameter, wherein the machine learning model is trained using a training set comprising a collection of data points associated with a labeled set of real property parcels distinct from the specified parcel of real property, the label indicating the particular parameter and corresponding value for each real property parcel of the training set; and based on the prediction, classifying the specified parcel of real property according to a determination of whether the predicted value of the parameter satisfies a threshold.

17 Claims, 3 Drawing Sheets

(56) References Cited

U.S. PATENT DOCUMENTS

2011/0238566 A1    9/2011  Santos

OTHER PUBLICATIONS

Egloff, "Monte Carlo algorithms for optimal stopping and statistical learning," 2005, The Annals of Applied Probability, vol. 15, No. 2, pp. 1396-1432 (Year: 2005), 37 pages.
Andrieu et al., "An introduction to MCMC for machine learning," Machine Learning, Jan. 2003, 50(1):5-43.
Choi et al., "Markov chain monte carlo estimation methods for structural equation modeling: a comparison of subject-level data and moment-level data approaches," Biometrics and Biostatistics International Journal, Dec. 20. 2017, 6(5):463-74.
Haddon, "Modelling and Quantitative Methods in Fisheries," (2nd ed.), Feb. 1, 2010, 21 pages.
Robinson, "Nondifferentiable Optimization," Jun. 7, 2015, obtained May 5, 2021 from URL <https://optimization.mccormick.northwestern.edu/index.php/Nondifferentiable_Optimization>, 5 pages.
Simes et al., "Model Title Standards," Ann Arbor: University of Michigan Law School, 1960, 56 pages.
Towers, "Markov Chain Monte Carlo parameter optimization method," Jul. 15, 2014, obtained May 5, 2021 from URL <http://sherrytowers.com/2014/07/15/markov-chain-monte-carlo-parameter-optimization-method/>, 5 pages.
U.S. Office Action in U.S. Appl. No. 90/014,729, dated Aug. 19, 2021, 17 pages.
U.S. Office Action in U.S. Appl. No. 90/014,729, dated Nov. 19, 2021, 41 pages.

\* cited by examiner

PREDICTIVE MACHINE LEARNING MODELS

BACKGROUND

This specification relates to machine learning. Conventional machine learning models can be used to classify particular input data. Typically, a machine learning model is trained using a collection of labeled training data. The machine learning model can be trained such that the model correctly labels the input training data. New data can then be input into the machine learning model to determine a corresponding label for the new data.

SUMMARY

In general, one innovative aspect of the subject matter described in this specification can be embodied in methods that include the actions of obtaining, from one or more sources, a plurality of data points associated with a specified parcel of real property; using a machine learning model to generate a prediction from the obtained plurality of data points, the prediction indicating a likelihood that the real property will satisfy a particular parameter, wherein the machine learning model is trained using a training set comprising a collection of data points associated with a labeled set of real property parcels distinct from the specified parcel of real property, the label indicating the particular parameter and corresponding value for each real property parcel of the training set; and based on the prediction, classifying the specified parcel of real property according to a determination of whether the predicted value of the parameter satisfies a threshold value.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The obtained plurality of data points includes a variety of data from a variety of data sources. The predicted parameter is whether or not a mortgage attached to the specified parcel of real property is open. In response to determining that the predicted likelihood that the mortgage is open satisfies the threshold, considering the mortgage closed. The data associated with the specified parcel of real property input to the machine learning model include dates associated with the recordation of one or more mortgages and transaction data indicating dates in which ownership of the parcel changed. The data includes an identification of potentially open mortgages both directly identified from parcel data or indirectly identified from the parcel data. Indirectly identified mortgages include determining the presence of an unrecorded mortgage based on a recorded subordinate mortgage.

The subject matter described in this specification can be implemented in particular embodiments so as to realize one or more of the following advantages. A machine learning model can be used to determine a likelihood that a mortgage for a parcel of real property is open using historical information for a collection of parcels of real property. This can greatly simplify the title insurance process of determining whether all prior mortgages on the parcel of real property have been paid without relying solely on human judgment or error prone data associated with the parcel. Mortgages having a high likelihood of being open can then be analyzed using conventional techniques.

The above techniques can be part of an automated underwriting system that programmatically evaluates title risk for a parcel of real property as part of generating a title insurance policy in a real estate transaction. Evaluating one or more risk factors programmatically improves efficiency in providing title insurance, which can reduce closing time and costs in real estate transactions. In addition, these methods can reduce the variability around closing times for a real estate transactions. This enables lenders and borrowers to more efficiently schedule their closings, at lower inconvenience to all parties involved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

This specification describes techniques for training, optimizing, and applying a machine learning model. The machine learning model can be trained to predict whether a parameter is likely to occur as well as a magnitude of the parameter. The machine learning model can be trained using a collection of data with known values for the prediction parameter. The output of the machine learning model can be compared with one or more thresholds to determine an action responsive to the prediction.

For example, the machine learning model can be used to evaluate a parameter associated with a parcel of real property based on a model trained from data obtained for a collection of other parcels of real property. The parameter being predicted can include a prediction of whether or not a mortgage attached to the property has been paid for each historical mortgage on the parcel of real property.

In particular, in a real estate transaction involving a parcel of real property, an important step is accounting for all mortgages that have attached to the property. In particular, in a purchase transaction for a parcel of real estate, a buyer may obtain a mortgage as part of the purchase. That mortgage lender needs to be the prime lienholder on the property without any intervening mortgages having precedence. Thus, it is important to ascertain whether any mortgages are still open on the property. Any identified defects, for example, an existing mortgage on the parcel, typically need to be resolved before a title company will issue title insurance for the parcel. In the event that an unidentified defect is later discovered, the title insurance insures against any losses resulting from the defect. Consequently, title insurance is often required in real estate transactions and particularly for those financed by third parties.

Existing data sources for mortgage information can be error prone. For example, an older mortgage may not be identified as closed even though it is no longer attached to the property. As a result, human reviewers are often required to examine the set of open mortgages to determine whether or not they are actual open or have been previously paid off. A machine learning model can be used to determine the likelihood that an identified mortgage is still open regardless of the status indicated in the data records for the parcel. Those that satisfy a specified threshold likelihood can be then evaluated by human reviewers.

Finally, the error prone nature of existing mortgage data can cause traditional title insurance providers to entirely miss a mortgage that is outstanding, because the mortgage data may simply not exist in the public record due to a human error. A machine learning model can be used to flag such a mortgage when another mortgage has been subordinated to it during a prior transaction. This model can reduce the risk of negative consumer or lender impact when such a mortgage is missed during the traditional process.

Streamlining the evaluation of open mortgages can facilitate decisions on issuing title insurance. In particular, the more facets of title insurance that can be determined programmatically, the faster title insurance decisions can be made.

Title Evaluation System

Figure 1:
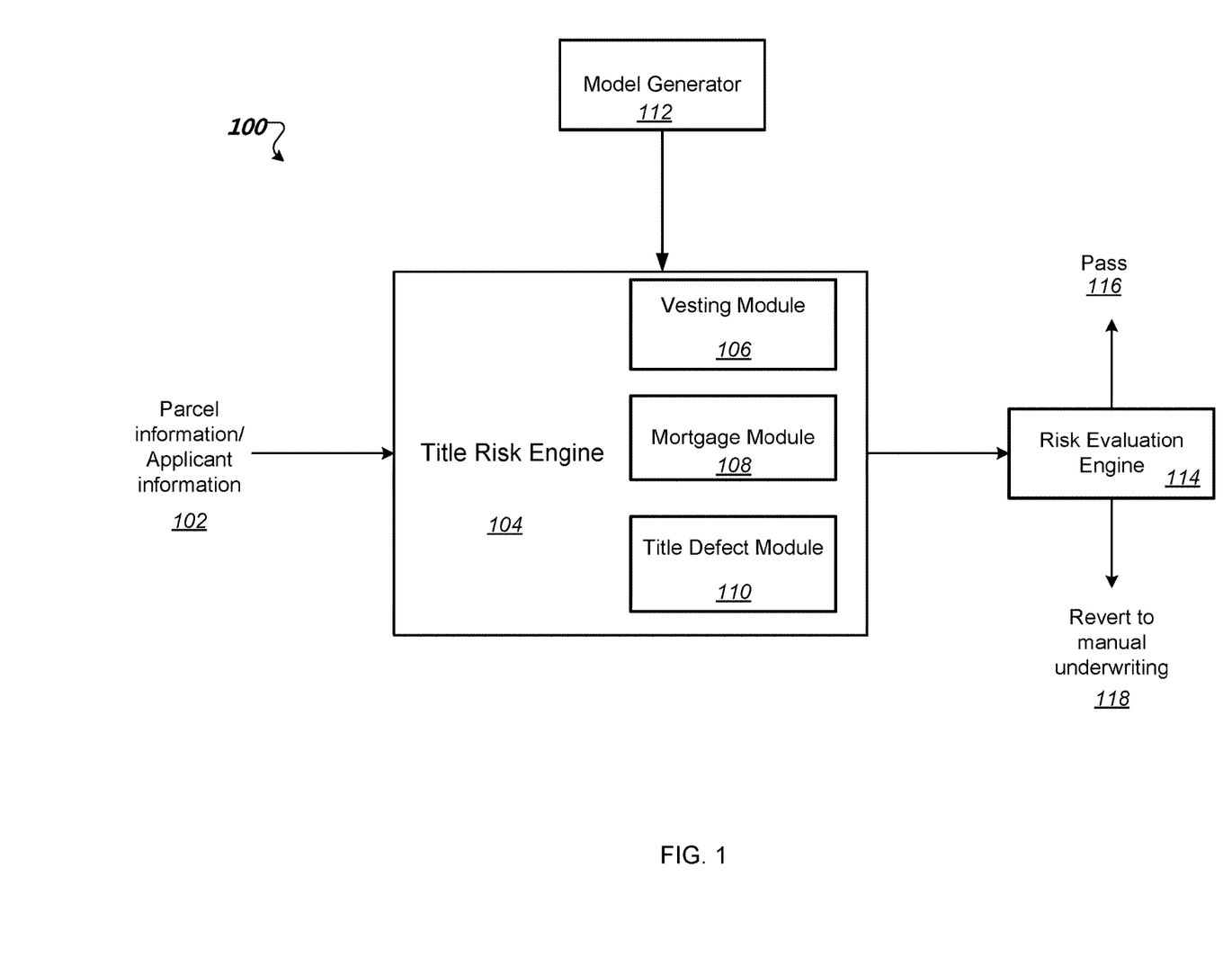
FIG. 1 is a block diagram of an example system for evaluating title risk.

FIG. 1 is a block diagram of an example system 100 for evaluating title risk, for example, as part of generating a title insurance policy. In some implementations, the system 100 can be used to generate a rapid decision as to whether to issue a title insurance policy or whether further analysis is required.

The system 100 includes a title risk engine 104. The title risk engine 104 processes parcel and/or party data 102 input to the system. For example, this can describe a number of different details about the parcel including mortgage information indicating when mortgages were recorded against the parcels as well as when any were removed. The information can also include transactions associated with the parcels including a retail history for the property, e.g., prior dates of sale. This can also include information about the parties involved in the transaction such as the purchaser and seller information for each historical transaction involving the parcel.

The title risk engine 104 processes the input data 102 to generate one or more risk scores that are passed to a risk evaluation engine 114. The processing of the input data can include processing by various modules designed to evaluate different kinds of title risk. These modules can include a vesting module 106, a mortgage module 108, and a title defect module 110. The vesting module 106 determines the current owner(s) of the parcel based on the input data. The mortgage module 108 uses a machine learning model to determine a likelihood of open mortgages associated with the real estate parcel. The title defect module 110 uses a machine learning model to determine a likelihood of a title defect associated with the parcel of real property based on the input data about the parcel of property, e.g., a likelihood of an existing lien against the property.

The mortgage module 108 and the title defect module 110 can use respective machine learning models trained by one or more model generator 112. The model generator 112 uses training data to train a model designed to generate a particular prediction based on input data, as described in greater detail below with respect to FIG. 3. An example machine learning model for determining a likelihood of a title defect can be found in U.S. Pat. No. 10,255,550, which is incorporated here by reference in its entirety.

The risk evaluation engine 114 can receive one or more scores from the title risk engine 104. Each score can indicate a likelihood of a particular parameter evaluated by the one or more modules. For example, a respective score can be provided for each identified open mortgage indicating a likelihood determined by the mortgage module 110 that the mortgage is still open. In another example, the score from the vesting module can indicate a level of confidence in identifying the name or names of the current owners of the parcel.

In response to receiving the scores, the risk evaluation engine 114 can determine whether to pass 116 the title analysis indicating that a title insurance policy can be issued without further human review or whether to revert to manual underwriting 118 for at least a portion of the title analysis. The determination can be based on one or more threshold values that indicate a risk tolerance for the particular parameter. In some implementations, a combined score can be compared to an overall threshold indicating risk tolerance for all of the predicted parameters. The combination can include weighting the score from a particular module based on the impact to acceptable risk associated with each parameter.

For example, the score determined for each open mortgage can be compared to the threshold value for open mortgages. If the score exceeds the threshold, e.g., the likelihood that the mortgage is open exceeds the threshold value, then the mortgage is passed to manual evaluation. If not, then the mortgage is within the risk tolerance and can be passed without further evaluation.

Determining Likelihood of Open Mortgages

Figure 2:
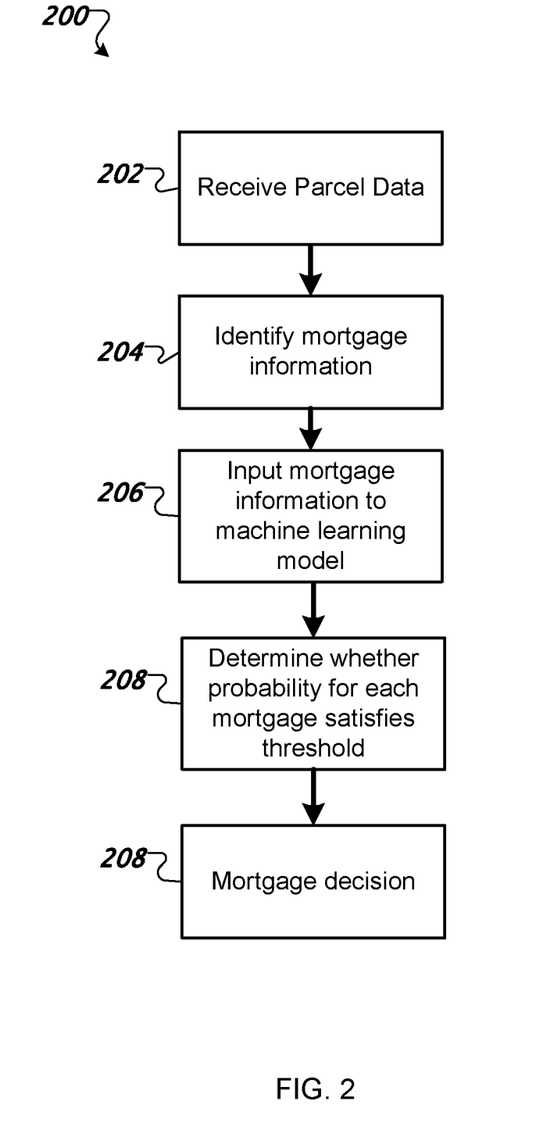
FIG. 2 is a flow diagram of an example method for using machine learning to evaluate open mortgages to real property.

FIG. 2 is a flow diagram of an example method 200 for using machine learning to evaluate open mortgages to real property. For convenience, the method 200 will be described as being performed by a system of one or more computers, located in one or more locations, and programmed appropriately in accordance with this specification. For example, system 100 of FIG. 1, appropriately programmed, can perform the method 200.

The system receives parcel data (step 202). The parcel data can be obtained from a third party service or collected from one or more data sources, e.g., county records offices. These records can include dates at which mortgages were recorded against the parcel of real property, dates of sales of the parcel, and dates when mortgages were removed from the parcel.

The system identifies the specific mortgage information from the parcel data (step 204). This includes identifying each mortgage recorded against the parcel and whether or not the parcel data indicates that the mortgage is open. In some implementations, if a mortgage is no longer open, e.g., a later record in the parcel data indicates that the mortgage has been closed, it can be discarded such that only a list of purportedly open mortgages remain.

The mortgage information can be extracted from the parcel data by looking for deeds of trusts, assignments, subordinations, releases, and similar data from the chain of title and compiling such data into the mortgage information data set. Each item in the mortgage information data set contains the instrument number, dollar amount, principal amount, grantee, grantor, and other relevant mortgage data.

The system inputs the mortgage information for the list to a machine learning model to generate a likelihood that each individual mortgage is actually open (step 206). The input to the machine learning model includes the dates associated with the identified mortgages in the parcel data as well as other statistical information retrieved from the parcel data, for example, the transaction dates associated with each sale or refinance of the parcel.

The machine learning model, described in greater detail below, is trained on a collection of parcel data for which information on mortgages is known. Based on a collection of training data from other parcels of real property the model is trained to evaluate the statistics for the parcel of interest to determine a prediction of how likely the mortgage is to be actually still open on the parcel. For example, if a change of ownership has occurred since the 'open' mortgage was recorded it may be less likely that the mortgage is actually open given that the training data indicates that existing mortgages are typically closed when the property changes hands. Another example would be the proximity of a mortgage to a foreclosure event, which typically renders such mortgages no longer open.

Another factor is whether the parcel data indicates an occurrence of a potentially open mortgage that does not directly appear in the parcel data. For example, an record of a subordinate mortgage in the parcel data can indicate a missing mortgage that may be open. For example, when an owner takes out a second mortgage on a property, that second mortgage is subordinated to the first mortgage because the first mortgage takes precedence over the second, e.g., during a sale or foreclosure. Such a mortgage may not have been even detected for evaluation in a traditional human search.

In particular, in some implementations, when a subordination is present without the primary mortgage can result in a fault that stops the process for identifying mortgages as potentially open and reverts to a full manual evaluation.

In some other implementations, such a fault can also be generated when the system cannot generate a prediction within a specified level of confidence that the mortgage is either open or closed.

For each mortgage in the list of potentially open mortgages, the machine learning model generates a respective probability that the mortgage is actually open. These probability scores are then evaluated with respect to a threshold value (step 208). The threshold can be established based on a level of acceptable risk based on the prediction. In some implementations, the threshold is set based upon an analysis of multiple factors. For example, a collection of historical data can be used to determine an historical occurrence for the parameter. In the case of title defects resulting from unaccounted for open mortgages, this can include past occurrences of similar defects and the value of the resulting title insurance claims. Few instances of significant defects can lead, for example, to a higher threshold level of risk being acceptable.

In some implementations, determining the threshold can include analyzing historical information on past claims relative to other operating expenses and revenue to determine the threshold level such that the model will only pass predicted occurrences of a title defect having magnitudes of cost within an acceptable amount of overall cost relative to revenue.

This threshold can be changed in view of actual performance of the model. For example, if a particular threshold leads to real world results of a higher number of errors than expected, then the threshold can be modified to require a lower likelihood that the mortgage is open to trigger manual evaluation.

Based on the comparison of the mortgages to the threshold value, a decision is made as to whether one or more of the mortgages require further analysis, e.g., manual evaluation by one or more human evaluators. In some implementations, if the likelihood that the mortgage is open is less than the threshold value, then the mortgage is considered closed for the purposes of generating the title insurance policy.

The resulting output from the comparison can be provided to one or more users. For example, the decision can be added to a file associated with the parcel of real property and a user associated with the file can be alerted to the decision. In some implementations, the decision is determined while an associated user is working with the system and the decision can be displayed in a user interface of the system.

Training a Machine Learning Model

Figure 3:
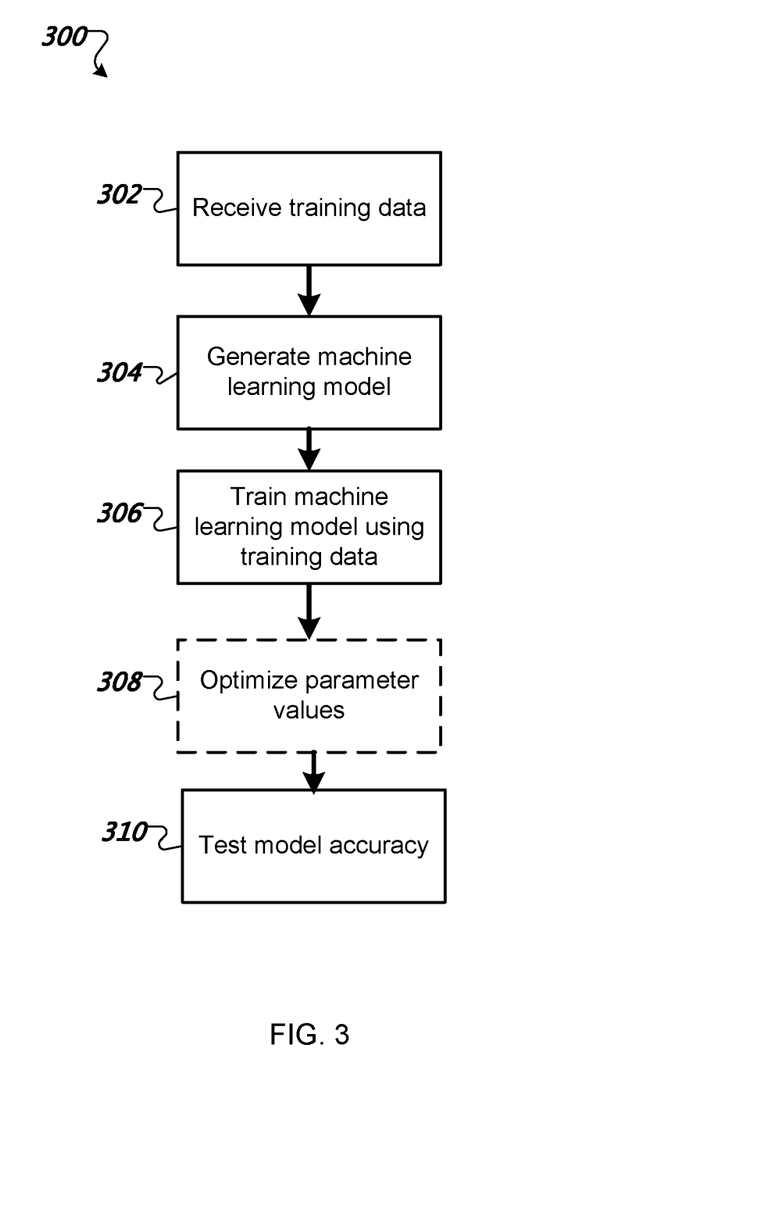
FIG. 3 is a flow diagram of an example method for training a machine learning model.

FIG. 3 is a flow diagram of an example method 300 for training a machine learning model. For convenience, the method 300 will be described as being performed by a system of one or more computers, located in one or more locations, and programmed appropriately in accordance with this specification. For example, model generator 112 of system 100 of FIG. 1, appropriately programmed, can perform at least part of the method 300.

The system receives training data from one or more data sources (step 302). The data sources can include a number of different databases including databases associated with public records locations as well as third party databases. In some implementations, a data aggregator can collect data associated with parcels of real estate. For example, in some implementations, the system is able to receive data from different local records offices for real property e.g., county records offices or property tax offices. The system can also receive data from third parties such as credit bureaus or title companies. In some implementations, the received training data includes unstructured content that that is processed to extract particular data. For example, optical character recognition can be used to identify content of a document which can be filtered based on identifying particular terms identified in the document.

The training data can be stored in a training data repository. The training data for a machine learning model often includes values for the parameter being predicted by the model. For example, in some implementations, the training data includes data values associated with a number of distinct parcels of real property. The data values for each parcel of real property can cover a variety of data including statistical data about the property itself including mortgage information indicating when mortgages are recorded against the parcels as well as when they are removed. The information can also include transactions associated with the parcels including a retail history for the property, e.g., prior dates of sale, as well as purchaser and seller information.

The system generates a machine learning model (step 304). The machine learning model can be based off of one or more existing machine learning models as a foundation and configured to use specific information as features to train the model to generate a prediction for a specified parameter. In particular, the prediction can be a calculated likelihood for the parameter such as a likelihood that an input mortgage for a parcel is still open.

The system trains the machine learning model using the training data (step 306). In some implementations, the obtained training data is used as input to a training engine that trains a machine learning model based on the data and the known parameter values. As part of the training, the training engine extracts features from the training data and assigns various weights to the features such that a prediction and magnitude for the parameter correspond to the known parameter values. In some implementations, the features correspond to the different types of data in the training data or a subset of the types of data. The training of the model can be an iterative process that adjusts features and associated weights to some specified degree of accuracy relative to the known parameter values.

In some implementations, the machine learning model is trained to generate predictions that a given mortgage identified for a parcel of real property is still open. This prediction is based on the training that takes the collection of training data to learn which factors increase or decrease a likelihood of a mortgage being open in view of the known mortgage information of the training data. For example, the training data can show that when there is a sales transaction subsequent to an attached mortgage, and a new mortgage is recorded as part of the sale, that the likelihood of the pre-sale mortgage being open is low. However, if that pre-sale mortgage was not directly listed in the parcel data, but only identified indirectly, this could increase the risk that the mortgage was missed in the last sale and therefore could be open.

Optionally, particular optimization processes can be performed including (step 308). This optimization further adjusts particular parameter values in order to generate model predications that minimize the error between the predication and real world outcomes.

The system tests the model accuracy (step 310). For example, the model can be tested against known parameter values for parcels that were not part of the training data to see if the model agrees with the known values. For a model trained to determine a likelihood of open mortgages, additional parcels with known mortgage histories can be input to the model to ensure that the model generates likelihoods that agree with the known histories. This evaluation can be performed, for example, to guard against a model that is overfit to the training data but leads to erroneous results on other data that is different than the training data. If deficiencies in the model are discovered, the model can be retrained, e.g., using additional training data that is more diverse.

The trained model can be stored as an output model or transmitted to another system, for example, to a title risk engine to be used as a particular module, e.g., mortgage module 108.

In some implementations of the above described techniques, some of the obtained data can be associated with particular individuals. The techniques can be implemented to protect individual privacy and include suitable controls on access to the information. For example, the personal information of a prospective buyer of a parcel of real property can be used in response to received consent from the prospective buyer. In some cases, identifiable information of individual can also be anonymized using a suitable technique and appropriate safeguards placed to protect the personal information.

The present specification describes unconventional steps to solve problems associated with assessing title risk that are distinct from the conventional approach. In particular, a prediction of open mortgages can be generated programmatically using a model based on other parcels of real property where the model prediction may also be based on specific data values of the particular parcel of real property. Vesting can also be performed programmatically to eliminate manual evaluation of property deeds. Performing mortgage and vesting assessments allows for quicker evaluation of title risks than a traditional title assessment.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining, from one or more sources, a plurality of data points associated with a specified parcel of real property;
   extracting specific mortgage information from the plurality of data points, including identifying each mortgage recorded against the parcel and an indication of whether the mortgage is open, and generating a set of potentially open mortgages;
   training a machine learning model with a training set comprising a collection of data points associated with a labeled set of real property parcels distinct from the specified parcel of real property, wherein the collection of data points for each real property parcel in the training set include statistical information about the real property parcel and a retail history of the property parcel, and wherein each label of the labeled set of the real property parcels indicates whether an open mortgage and a corresponding title defect value existed;
   generating a prediction for each mortgage, in the set of potentially open mortgages, from the obtained plurality of data points using the trained machine learning model, the prediction indicating a likelihood that the real property will satisfy a particular parameter including a likelihood that a potentially open mortgage attached to the specified parcel of real property is actually open;
   determining whether the prediction for the particular parameter satisfies a threshold value; and
   classifying the specified parcel of real property as likely having an open mortgage or not having an open mortgage based on the determination.

2. The method of claim 1, wherein the obtained plurality of data points comprises a variety of data from a variety of data sources.

3. The method of claim 1, further comprising:
   determining whether the prediction for the particular parameter does not satisfies the threshold value, considering the mortgage closed.

4. The method of claim 1, wherein the obtained plurality of data points associated with the specified parcel of real property used in the trained machine learning model include dates associated with a recordation of one or more mortgages and transaction data indicating dates in which ownership of the specified parcel of real property changed.

5. The method of claim 4, further comprising:
   identifying potentially open mortgages including one or more of identifying directly from parcel data or identifying indirectly from the parcel data.

6. The method of claim 5, wherein identifying potentially open mortgages indirectly from the parcel data includes determining a presence of an unrecorded mortgage based on a recorded subordinate mortgage.

7. A system comprising:
   one or more computers and one or more storage devices storing instructions that are operable, when executed by the one or more computers, to cause the one or more computers to perform operations comprising:
   obtaining, from one or more sources, a plurality of data points associated with a specified parcel of real property;
   extracting specific mortgage information from the plurality of data points, including identifying each mortgage recorded against the parcel and an indication of whether the mortgage is open, and generating a set of potentially open mortgages;
   training a machine learning model with a training set comprising a collection of data points associated with a labeled set of real property parcels distinct from the specified parcel of real property, wherein the collection of data points for each real property parcel in the training set include statistical information about the real property parcel and a retail history of the property parcel, and wherein each label of the labeled set of the real property parcels indicates whether an open mortgage and a corresponding title defect value existed;
   generating a prediction for each mortgage, in the set of potentially open mortgages, from the obtained plurality of data points using the trained machine learning model, the prediction indicating a likelihood that the real property will satisfy a particular parameter including a likelihood that a potentially open mortgage attached to the specified parcel of real property is actually open;
   determining whether the prediction for the particular parameter satisfies a threshold value; and
   classifying the specified parcel of real property as likely having an open mortgage or not having an open mortgage based on the determination.

8. The system of claim 7, wherein the obtained plurality of data points comprises a variety of data from a variety of data sources.

9. The system of claim 7, further comprising:
   determining whether the prediction for the particular parameter does not satisfies the threshold value, considering the mortgage closed.

10. The system of claim 7, wherein the obtained plurality of data points associated with the specified parcel of real property used in the trained machine learning model include dates associated with a recordation of one or more mortgages and transaction data indicating dates in which ownership of the specified parcel of real property changed.

11. The system of claim 10, further comprising:
    identifying potentially open mortgages including one or more of identifying directly from parcel data or identifying indirectly from the parcel data.

12. The system of claim 11, wherein identifying potentially open mortgages indirectly from the parcel data includes determining a presence of an unrecorded mortgage based on a recorded subordinate mortgage.

13. One or more non-transitory computer-readable storage media encoded with instructions that, when executed by one or more computers, cause the one or more computers to perform operations comprising:
    obtaining, from one or more sources, a plurality of data points associated with a specified parcel of real property;
    extracting specific mortgage information from the plurality of data points, including identifying each mortgage recorded against the parcel and an indication of whether the mortgage is open, and generating a set of potentially open mortgages;
    training a machine learning model with a training set comprising a collection of data points associated with a labeled set of real property parcels distinct from the specified parcel of real property, wherein the collection of data points for each real property parcel in the training set include statistical information about the real property parcel and a retail history of the property parcel, and wherein each label of the labeled set of the real property parcels indicates whether an open mortgage and a corresponding title defect value existed;

generating a prediction for each mortgage, in the set of potentially open mortgages, from the obtained plurality of data points using the trained machine learning model, the prediction indicating a likelihood that the real property will satisfy a particular parameter including a likelihood that a potentially open mortgage attached to the specified parcel of real property is actually open;

determining whether the prediction for the particular parameter satisfies a threshold value; and classifying the specified parcel of real property as likely having an open mortgage or not having an open mortgage based on the determination.

14. The one or more non-transitory computer-readable storage media of claim 13, wherein the obtained plurality of data points comprises a variety of data from a variety of data sources.

15. The one or more non-transitory computer-readable storage media of claim 13, further comprising:
determining whether the prediction for the particular parameter does not satisfies the threshold value, considering the mortgage closed.

16. The one or more non-transitory computer-readable storage media of claim 13, wherein the obtained plurality of data points associated with the specified parcel of real property used in the trained machine learning model include dates associated with a recordation of one or more mortgages and transaction data indicating dates in which ownership of the specified parcel of real property changed.

17. The one or more non-transitory computer-readable storage media of claim 16, wherein identifying potentially open mortgages indirectly from the parcel data includes determining a presence of an unrecorded mortgage based on a recorded subordinate mortgage.

* * * * *